United States Patent
Saby et al.

(10) Patent No.: US 11,003,232 B2
(45) Date of Patent: May 11, 2021

(54) POWER MANAGEMENT INTEGRATED CIRCUIT INCLUDING A SUPERVISORY CIRCUIT THAT CONTROLS A SWITCH ARRANGED BETWEEN A NODE OF AN ELECTRICAL RESISTANCE CIRCUIT AND A REFERENCE POTENTIAL NODE

(71) Applicant: EM Microelectronic-Marin SA, Marin (CH)

(72) Inventors: Jerome Saby, Colombier (CH); Matteo Contaldo, Chavannes-pres-Renens (CH); Yves Theoduloz, Yverdon (CH)

(73) Assignee: EM Microelectronic-Marin SA, Marin (CH)

( * ) Notice: Subject to any disclaimer, the term of this patent is extended or adjusted under 35 U.S.C. 154(b) by 147 days.

(21) Appl. No.: 16/371,458

(22) Filed: Apr. 1, 2019

(65) Prior Publication Data

US 2019/0310699 A1     Oct. 10, 2019

(30) Foreign Application Priority Data

Apr. 4, 2018 (EP) ..................................... 18165651

(51) Int. Cl.
*G06F 1/00*           (2006.01)
*G06F 1/3206*      (2019.01)
(Continued)

(52) U.S. Cl.
CPC .............. *G06F 1/3206* (2013.01); *G06F 1/28* (2013.01); *G06F 1/3234* (2013.01); *G06F 1/3287* (2013.01); *H02M 1/36* (2013.01)

(58) Field of Classification Search
CPC ........ G06F 1/28; G06F 1/3206; G06F 1/3234; G06F 1/3287; H02M 1/36
See application file for complete search history.

(56) References Cited

U.S. PATENT DOCUMENTS

| 9,342,084 B1 * | 5/2016 | Konecny | H03K 5/24 |
| 2004/0090805 A1 * | 5/2004 | Kitano | H02J 1/04 |
| | | | 363/55 |

(Continued)

FOREIGN PATENT DOCUMENTS

| CN | 103268144 | 8/2013 |
| EP | 1 808 743 A1 | 7/2007 |

OTHER PUBLICATIONS

European Search Report dated Oct. 3, 2018 in European Application 18165651.3, filed on Apr. 4, 2018 (with English translation of categories of Cited Documents and Written Opinion).

*Primary Examiner* — Nitin C Patel

(74) *Attorney, Agent, or Firm* — Oblon, McClelland, Maier & Neustadt, L.L.P.

(57) ABSTRACT

A power management integrated circuit including a reference signal generator, a start-up unit and a supervisory circuit. The supervisory circuit includes an electrical resistance circuit connected between a first end node and a second end node; a power supply input for receiving a supply voltage, this power supply input being connected to the first end node; a low reference potential node; a comparator for comparing a reference voltage value at a first input and a divided voltage value at a second input connected to an internal electrical node of the electrical resistance circuit, the comparator can output a monitoring signal. The supervisory circuit includes a switch controlled by the start-up unit so that the switch is selectively closed and opened based on a detected operational state of the reference signal generator indicating a normal functioning phase of the power management circuit.

6 Claims, 3 Drawing Sheets

(51) Int. Cl.
*G06F 1/28* (2006.01)
*H02M 1/36* (2007.01)
*G06F 1/3234* (2019.01)
*G06F 1/3287* (2019.01)

(56) References Cited

U.S. PATENT DOCUMENTS

| | | |
|---|---|---|
| 2010/0008117 A1 | 1/2010 | Luthi et al. |
| 2011/0119017 A1 | 5/2011 | Kamp et al. |
| 2012/0049823 A1* | 3/2012 | Chen ................... H02M 1/36 323/282 |
| 2012/0163054 A1 | 6/2012 | Luthi et al. |

* cited by examiner

Fig. 1 --Related Art--

POWER MANAGEMENT INTEGRATED CIRCUIT INCLUDING A SUPERVISORY CIRCUIT THAT CONTROLS A SWITCH ARRANGED BETWEEN A NODE OF AN ELECTRICAL RESISTANCE CIRCUIT AND A REFERENCE POTENTIAL NODE

CROSS-REFERENCE TO RELATED APPLICATION

This application claims priority to European Patent Application No. 18165651.3 filed on Apr. 4, 2018, the entire disclosure of which is hereby incorporated herein by reference.

TECHNICAL FIELD

The present invention relates to a power management integrated circuit comprising a reference signal generator, a start-up circuit or unit and a supervisory circuit. The invention also relates to a method for operating such a power management integrated circuit.

BACKGROUND OF THE INVENTION

Power management integrated circuits are circuits used for managing power requirements of at least another circuit or an electronic device, often referred to as a host system. Thus, power management integrated circuits may refer to a wide range of circuits. However, most include some electronic power conversion and/or power control functions. A power management circuit is generally included in battery-operated electronic devices, such as mobile phones and portable media players, in particular to decrease the amount of space required.

FIG. 1 shows a simplified circuit diagram illustrating an example of a known power management circuit. The circuit of FIG. 1 is divided into three main parts, which are a reference signal generator 3, a power management unit 5 and a supervisory circuit 7. The reference signal generator 3 comprises a start-up circuit 9, a bias or reference current generator 11 and a reference voltage generator 13. The start-up circuit in turn comprises a start-up resistor 15 connected between a switch 17 and a power supply input 19 arranged to receive a supply voltage $V_{bat}$ from a power source. The switch 17 is controlled by a start-up unit 21 incorporated in the start-up circuit 9. This start-up unit is arranged to first generate, in an initial start-up phase or mode, a start-up current for starting-up the reference signal generator and then the whole power management circuit. The start-up unit is also arranged for detecting whether the reference current generator 11 has started to operate correctly, in order to terminate the start-up phase, by detecting whether a bias current $I_{bias}$, provided by this reference current generator at a current sensing input of the start-up unit, reaches a minimal value of a certain range of current values corresponding to a normal functioning of the reference signal generator. Thus, the start-up unit assures a correct start-up of the reference signal generator, in particular that the obtained stable operating point of this generator corresponds to the expected one and not to a possible unwanted other stable point. Finally, in a normal functioning phase or mode, the start-up unit continues to monitor the value of the bias current in order to determine whether it remains within the mentioned range of current values.

The start-up unit 21 needs to have a simple analog design allowing the generation of a start-up current to prime (to initiate/start-up) the reference current generator 11, before the power management circuit has established a reference voltage and a regulated voltage. This means that the start-up unit, for allowing the start-up phase, needs to be functional before the whole power management circuit. The start-up unit thus needs to be first launched directly from the power source for generating a start-up current. For this purpose, in order to have an efficient and reliable start-up phase, the generation of the start-up current is triggered directly by a detection that the supply voltage $V_{bat}$ is at a high level, i.e., that the input voltage detected by the start-up unit is above the voltage threshold which is generated by the start-up unit itself. The generation of the start-up current is thus controlled by such a detection. When the start-up unit 21 detects a high level at its voltage sensing input, meaning that the supply voltage $V_{bat}$ is above the voltage threshold, it generates a start-up current to prime the reference current generator 11, so that a reference voltage $V_{ref}$ can then be established. It follows that, in order to stop the generation of the start-up current when the start-up phase terminates, it is needed to set the input voltage detected by the start-up unit at a low level, well under the threshold voltage. For that purpose, the start-up resistor 15 and the switch 17 are incorporated, in a series configuration, in the start-up circuit 9 with the voltage sensing input of the start-up unit connected between them.

It is to be noted that the transistor forming the switch 17 is designed to be open when not powered. Thus, the switch 17 is initially open and remains in this state until the start-up unit changes its state after a reference voltage and a regulated voltage have been established, i.e., when the start-up phase terminates. For controlling the switch 17, the start-up unit 21 determines whether a bias current $I_{bias}$ provided by the reference current generator at a current sensing input of this start-up unit is within a normal range of current values, in order to detect whether the reference current generator 11 has started to operate normally. Once the start-up unit 21 detects that the reference current generator has started to operate normally, it closes the switch 17 so that the input voltage detected by the start-up unit has then a value corresponding to the Ground GND. The closing of the switch 17 terminates the generation of the start-up current and thus the start-up phase. This is the raison why this switch 17 is needed and has to be closed when the power management circuit enters in a normal functioning phase.

Finally, when the bias current does not remain in the mentioned normal range but felt under this normal range, the start-up unit 21 opens the switch 17 or the power management circuit does no more power enough this switch so that it returns to its initial open state. The switch 17 and the start-up unit 21 function as an analog loop. The start-up unit 21, after having closed the switch 17, is arranged to maintain a supply voltage on the control gate of the switch as long as the bias current $I_{bias}$ is within the given normal range. As long as the start-up unit detects a voltage value lower than the threshold voltage (in particular approximately corresponding to GND due to the closed state of the switch 17), it does not again initiate a start-up phase. When the start-up phase is terminated, it is thus important to maintain the switch 17 in a closed state to not generate again the start-up current during the steady state operational phase (i.e., the normal functioning phase). Thus, during the steady state operational phase, the switch 17 must remain closed. However, by doing this, an electrical current continuously flows through the resistor 15.

In the example illustrated in FIG. 1, the supervisory circuit 7 is configured to output a first output voltage signal $S_{V1}$ and a second output voltage signal $S_{V2}$. These two voltages values take binary values, i.e. a logical '0' or '1'. A sub-circuit 23 inside the supervisory circuit 7 is used to determine the values of the signals $S_{V1}$ and $S_{V2}$. In this example, the sub-circuit 23 has a first input node and a second input node to provide divided voltage values of the supply voltage $V_{bat}$. A set of resistors 25 connected in series is used to obtain the divided supply voltage values, as this is better shown on FIG. 2 (embodiment of the present invention, which will be described in the following). The sub-circuit 23 further has a third input node for receiving a reference voltage value $V_{ref}$ generated by the voltage reference generator 13 and a fourth input node receiving a binary reset signal por_n from the power management unit 5. The inputs at the third and fourth nodes are also used to control the values of the first and second output voltage signals $S_{V1}$ and $S_{V2}$.

High power consumption is the main disadvantage with the above described circuit. The high power consumption is to a great extent due to the fact that during a normal, steady state operation, a current constantly flows through the start-up resistor 15 and the set of resistors 25. In addition, power is consumed by the other circuits elements. The currents through the start-up resistor 15 and the set of resistors 25 may easily be approximately 50% of the entire power consumption in the power management integrated circuit. This power consumption can be reduced by increasing the resistance of the resistors arranged in a series configuration, but this has the disadvantage of increasing the silicon surface area.

SUMMARY OF THE INVENTION

It is an object of the present invention to overcome at least some of the problems identified above relating to power management circuits and in particular relating to their high power consumption.

For this purpose, the present invention concerns a power management circuit comprising a reference signal generator arranged for providing a reference signal, a start-up unit and a supervisory circuit. The start-up unit has a first sensing input for detecting whether a supply voltage provided to the power management circuit is above a threshold voltage. This start-up unit is arranged so as, on the one hand, to be able to generate, during a start-up phase, a start-up current for starting-up the reference signal generator when the supply voltage is detected to be above the threshold voltage and, on the another hand, to stop generating such a start-up current when the power management circuit enters a steady state operational phase and then during this steady state operational phase. The start-up unit has a second sensing input connected to the reference signal generator and arranged for receiving from this reference signal generator a state signal indicating whether the power management circuit is in the steady state operational phase. The supervisory circuit comprises:

an electrical resistance circuit comprising a set of electrical resistance elements connected between a first end node and a second end node of this electrical resistance circuit;
a high power supply input arranged for receiving the supply voltage and connected to the first end node of the electrical resistance circuit;
a reference potential node defining a low power supply input;
a comparator for comparing the reference signal at a first input and an intermediate electrical value at a second input, this second input being connected to an internal electrical node of the electrical resistance circuit, this internal electrical node being located between two consecutive electrical resistance elements of the electrical resistance circuit, the comparator being configured to output a monitoring signal at a comparator output for monitoring the supply of a given electrical level related to the intermediate electrical value;

The power management circuit is characterised in that the supervisory circuit further comprises a switch arranged between the second end node of the electrical resistance circuit and the reference potential node, this switch being open when not powered; and in that the start-up unit is arranged for controlling the switch in order to maintain this switch in an open state in the start-up phase and to close the switch when the power management circuit terminates the start-up phase and enters the steady state operational phase, as well as to maintain this switch in an closed state during the steady state operational phase.

The proposed solution has the advantage that the power consumption in the power management circuit can be considerably reduced compared to power management circuits of the type shown on FIG. 1 because, thanks to the proposed solution, there is no need to have a separate start-up resistor in the reference signal generator. Furthermore, the silicon surface area can be kept small.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF THE INVENTION

Figure 1:
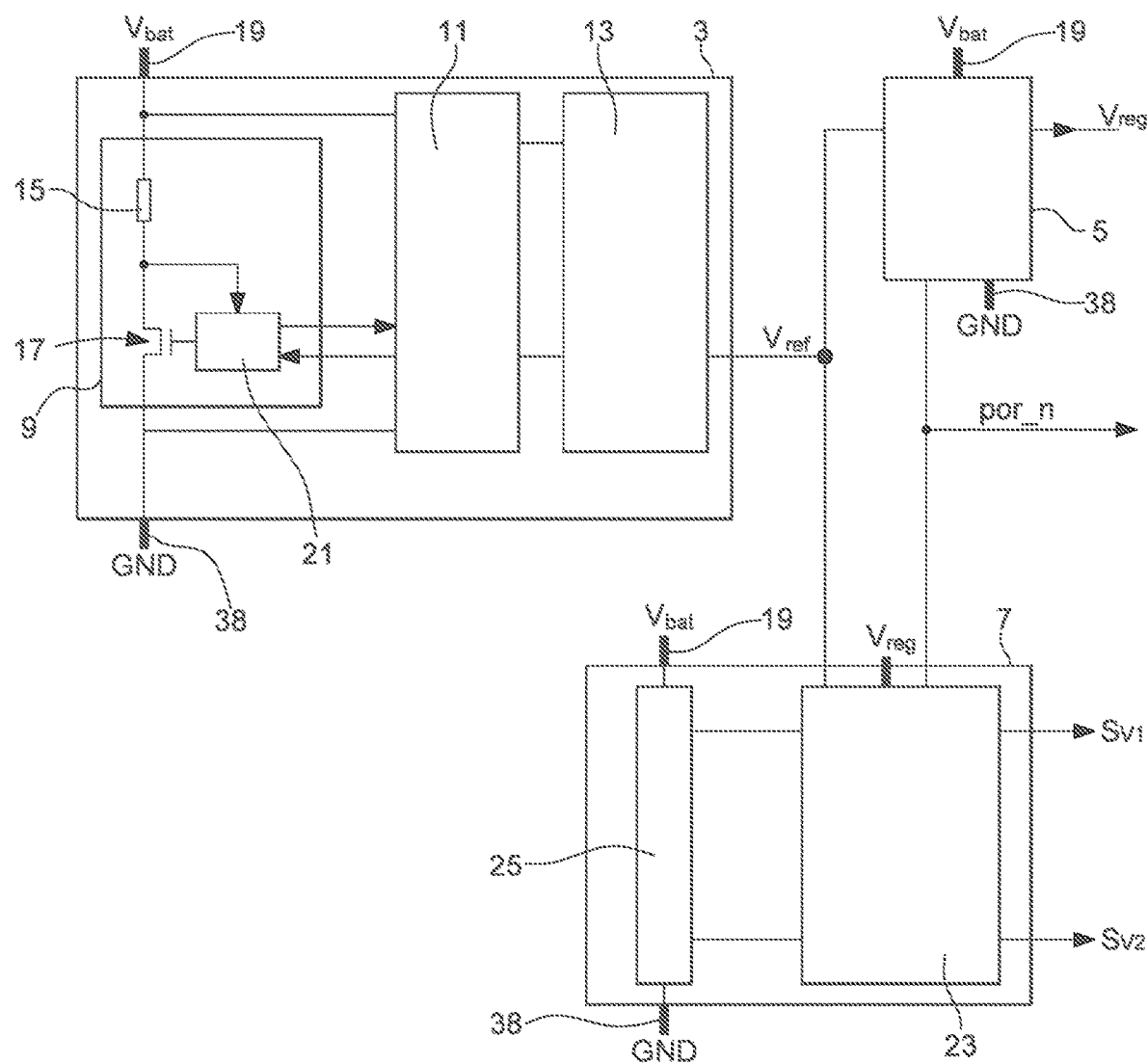
FIG. 1 is a simplified circuit diagram illustrating some elements of a known power management circuit.

An embodiment of the present invention will now be described in detail with reference to FIGS. 2 and 3. The invention will be described in the context of a power management integrated circuit comprising a reference signal generator, a start-up unit and a supervisory circuit for monitoring at least a supply voltage level of the power management circuit and/or of a circuit connected to the power management circuit. However, the teachings of the invention are not limited to this environment or application. Identical or corresponding functional or structural elements which appear in different drawings are assigned the same reference numerals. As utilised herein, "and/or" means any one or more of the items in the list joined by "and/or". Furthermore, the term "comprise" is used herein as an open-ended term. This means that the object encompasses all the elements listed, but may also include additional, unnamed elements. Thus, the word "comprise" is interpreted by the broader meaning "include" or "contain".

Figure 2:
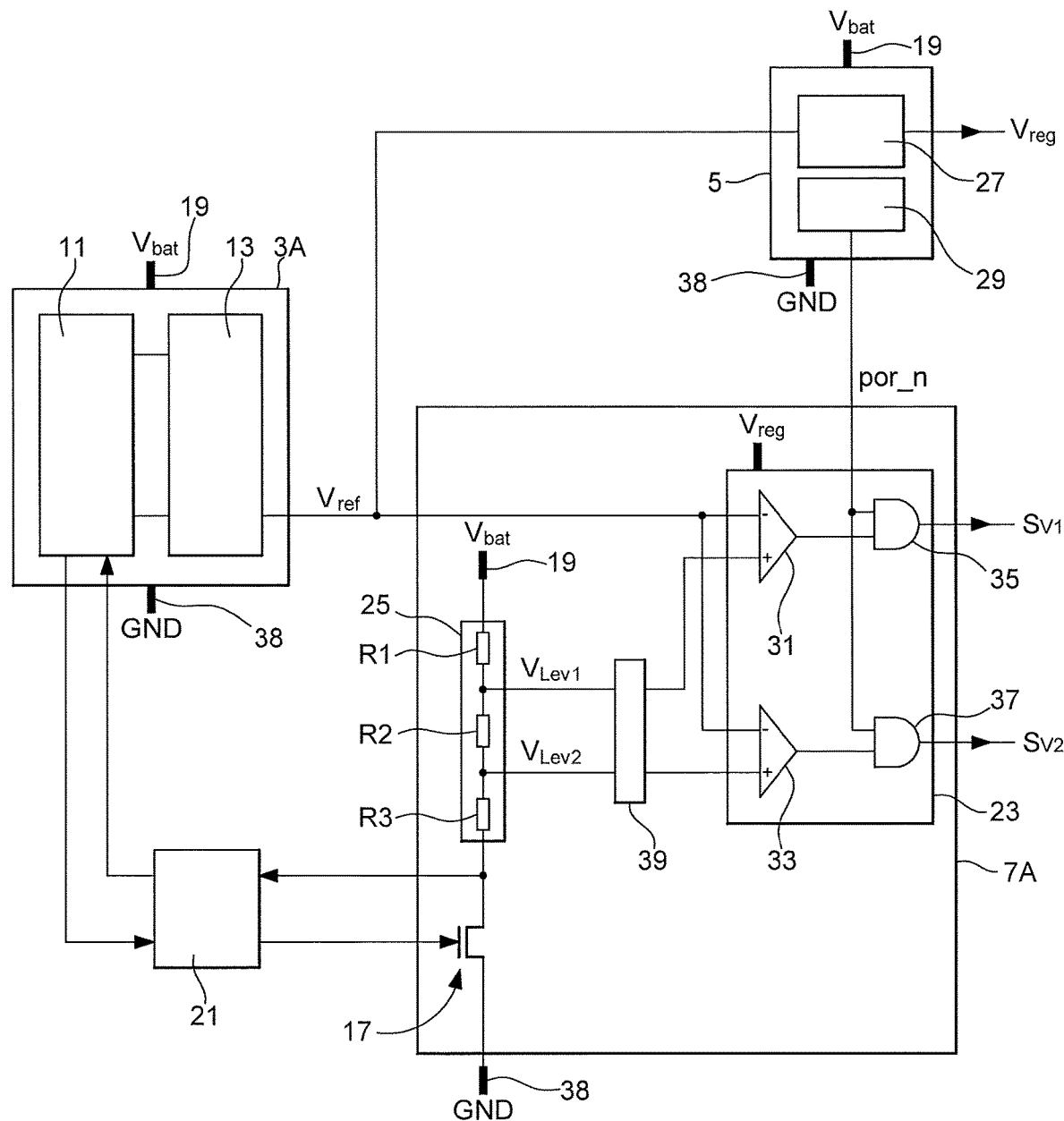
FIG. 2 is a circuit diagram illustrating a circuit configuration of a power management circuit according to an embodiment of the present invention.

FIG. 2 illustrates a power management circuit 1 of the present invention. As in the configuration of FIG. 1, the circuit of FIG. 2 comprises three main components or sub-circuits, which are the reference signal generating circuit 3A (or a reference signal generator for short), the power management unit 5 and the supervisory circuit 7A. Supervisory circuits are electronic circuits that monitor one or more parameters of systems, such as power supplies and microprocessors, which must be maintained within certain limits, and take appropriate action if the one or more parameters go(es) out of bounds. Supervisory circuits are also sometimes referred to as monitoring circuits, battery monitors, power supply monitors, supply supervisory circuits, and reset circuits. The reference signal generator 3A of FIG. 2 differs from the configuration of FIG. 1 in that the start-up circuit 9 of FIG. 1 is now removed from the circuit of FIG. 2. However, the functions of the start-up circuit are kept but implemented in a different manner allowing to significantly decrease the power consumption of the power management circuit and also to reduce the circuit surface needed for the resistors. For this purpose, the start-up unit 21 and the switch 17 are both incorporated in the embodiment of the invention and are working together in a same manner as described before in the background of the invention. However, a major difference is that the switch 17 is now implemented in the supervisory circuit 7A and arranged between the resistor circuit 25 and the Ground potential GND. It follows that there is now only one set of electrical resistance elements, forming the resistor circuit 25, remaining in the power management circuit 1, i.e., the one needed for the functioning of the supervisory circuit during the normal functioning phase of this power management circuit. In the embodiment of the invention, there is no more a resistor (resistor 15 of FIG. 1) in the reference signal circuit 3A. Nevertheless, for the start-up operation, a part of the supervisory circuit is used, this part being the resistor circuit 25 which is used, after the start-up phase, for dividing the supply voltage, as explained later in more details. The invention takes advantage from the following observations of the inventors: a) the resistor circuit 25 is needed for the supervisory circuit; b) a current must flow through the resistor circuit 25 during the normal functioning phase (steady state mode); and c) there is no need to have a current flowing through the resistor circuit during the start-up phase (this start-up phase having been described in details in the background of the invention). The inventors have realized that the switch 17 can be inserted in the supervisory circuit between a low voltage supply node (here GND) and the resistor circuit 25, this resistor circuit and the switch 17 been thus arranged, in a series configuration, between the high voltage supply node 19 (receiving the power supply $V_{bat}$ from a battery) and the low voltage supply node GND. By doing so, the switch 17 can be controlled in the same manner as in the known device of FIG. 1, so that the functioning of this switch 17 remains the same as in this known device. It results that the start-up phase remains efficient and liable and the functioning of the power management circuit 1 is as well efficient as the functioning of the known device of FIG. 1, but with less power consumption during the normal functioning phase (steady state mode) and with a smaller dimension of the integrated circuit forming this power management circuit.

The power management unit 5 comprises in this example a regulator unit 27, which is configured to fix a regulated output voltage $V_{reg}$ to a given value, which in this example is substantially 1.8 V. The power management unit 5 is supplied or powered by the supply voltage $V_{bat}$, which also supplies the reference signal generator 3A and the supervisory circuit 7A. In this example, the voltage $V_{bat}$ is arranged to vary between 5 V and 24 V. The power management unit also comprises a power-on reset (PoR) generator or unit 29. The power-on reset (PoR) generator generates a reset signal, referred to here as a por_n, when power is applied to it. It ensures that the power management circuit 1 starts operating in a known state.

The digital por_n signal is fed to the supervisory circuit 7A to control its operation as explained later in more detail. In this example the sub-circuit 23 of the supervisory circuit comprises a first comparator 31, a second comparator 33, a first AND gate 35 and a second AND gate 37. Each of the two comparators has an analog negative input terminal or node, an analog positive input terminal or node and one binary negative output terminal or node. The negative input terminals of the comparators are connected to the output of the reference voltage generator 13 to receive the reference voltage $V_{ref}$ as an input voltage. The positive input terminal of the first comparator 31 receives a first divided supply voltage value, referred to as an intermediate voltage $V_{Lev1}$, while the positive input terminal of the second comparator 33 receives a second divided supply voltage value, referred to as an intermediate voltage $V_{Lev2}$. It is to be noted that the voltage values $V_{ref}$, $V_{Lev1}$ and $V_{Lev2}$ are all analog voltage values. The output terminal of the first comparator 31 is connected to one of the input terminals of the first AND gate 35, while the output terminal of the second comparator 33 is connected to one of the input terminals of the second AND gate 37. The other AND gate input terminals are connected to the PoR generator to receive the por_n signal. In this example, the output voltage of the first comparator equals '1' if $V_{Lev1}>V_{ref}$, otherwise the output equals '0'. By analogy, the output voltage of the second comparator equals '1' if $V_{Lev2}>V_{ref}$, otherwise the output equals '0'.

The supervisory circuit 7A also comprises the electrical resistance circuit 25 comprising a set of electrical resistance elements, referred to as resistors, preferably arranged in a series configuration. In this example, there are three resistors, namely a first resistor R1, a second resistor R2 and a third resistor R3. A first node or end of the resistor circuit 25 is connected to the power supply source 19 configured to provide the supply voltage $V_{bat}$, while a second node or end of the resistor circuit 25 is connected to a switch 17. In this example, the switch is a transistor, and more specifically an n-type metal-oxide-semiconductor field effect transistor (MOSFET). The operation of the switch 17 is controlled by the start-up unit 21 (or start-up detector for short). The switch 17 is arranged to be either closed or open. In the present description, when a switch is said to be closed, then the path between the source and drain nodes is electrically conductive, whereas when a switch is said to be open, then this path is not electrically conductive. The operation of the start-up unit is in turn arranged to be controlled by a reference current $I_{bias}$ received from the reference current generator 11 where this current is generated. In this example, the second node of the resistor circuit 25 is connected to the drain terminal or node of the switch 17, while the source terminal or node of the switch 17 is connected to a reference node 38 with a constant potential value (also named low voltage supply input of the power management circuit). In this specific example, the source terminal of the switch 17 is grounded (i.e. at zero potential). It is to be noted that the first divided supply voltage $V_{Lev1}$ is measured at a first internal electrical node located between the first and second resistors, while the second divided supply voltage $V_{Lev2}$ is measured at a second internal electrical node located between the second and third resistors.

In the configuration of FIG. 2, the supervisory circuit 7A further comprises an optional protection circuit 39. The protection circuit is arranged to disconnect the respective input terminal of the two comparators from the resistor circuit 25 if the first divided supply voltage $V_{Lev1}$ (first intermediate value) or the second divided supply voltage $V_{Lev2}$ (second intermediate value) reaches the voltage level of $V_{reg}$, which is used as a supply voltage for the two comparators 31, 33. More specifically, if the voltage $V_{Lev1}$ increases too high to reach the level of $V_{reg}$, then the positive input terminal of the first comparator 31 is disconnected from the resistor circuit 25, while if the voltage $V_{Lev2}$ increases too high to reach the level of $V_{reg}$, then the positive input terminal of the second comparator 33 is disconnected from the resistor circuit 25. It is to be noted that when the switch 17 is open, the voltage values $V_{Lev1}$ and $V_{Lev2}$ substantially equal to $V_{bat}$, which might damage the comparators unless protected by the protection circuit 39. The protection circuit is typically needed, if high supply voltage levels are used.

The operation of the supervisory circuit is explained next in more detail with reference to FIG. 3 (already substantially described in the background of the invention). When the start-up unit 21 detects that the voltage level at the drain terminal of the switch 17 equals or substantially equals the supply voltage value $V_{bat}$, it instructs the reference signal generator 3A (i.e. the reference current generator 11 and/or the reference voltage generator 13) to start operating. It is to be noted that the start-up unit 21 only approximately knows what the current supply voltage level at a given moment is. At this moment, the power management circuit is in a first operational phase or state, which is referred to as a start-up phase. During this phase, the supervisory circuit is not yet operating. This means that the por_n signal equals '0', as also shown in FIG. 3, and thus blocks the operation of the supervisory circuit 7A.

Once the reference current generator 11 has completed its start-up phase, it informs the start-up unit 21 accordingly. At this moment, the start-up unit 21 closes the switch 17. At this moment the power management circuit has reached a second operational phase or state, referred to as a steady state operational phase or normal operational phase. In FIG. 3, the start-up phase is indicated with forward hashing, while the steady state phase is indicated with backward hashing. When the voltage $V_{reg}$ becomes greater than an internal reference voltage of the POR generator 29 $V_{por}$, the por_n signal is set to '1' as also shown in FIG. 3. Now the values of the first and second output voltage signals $S_{V1}$ and $S_{V2}$ are allowed to be set to '1' depending on the operation of the sub-circuit 23.

Figure 3:
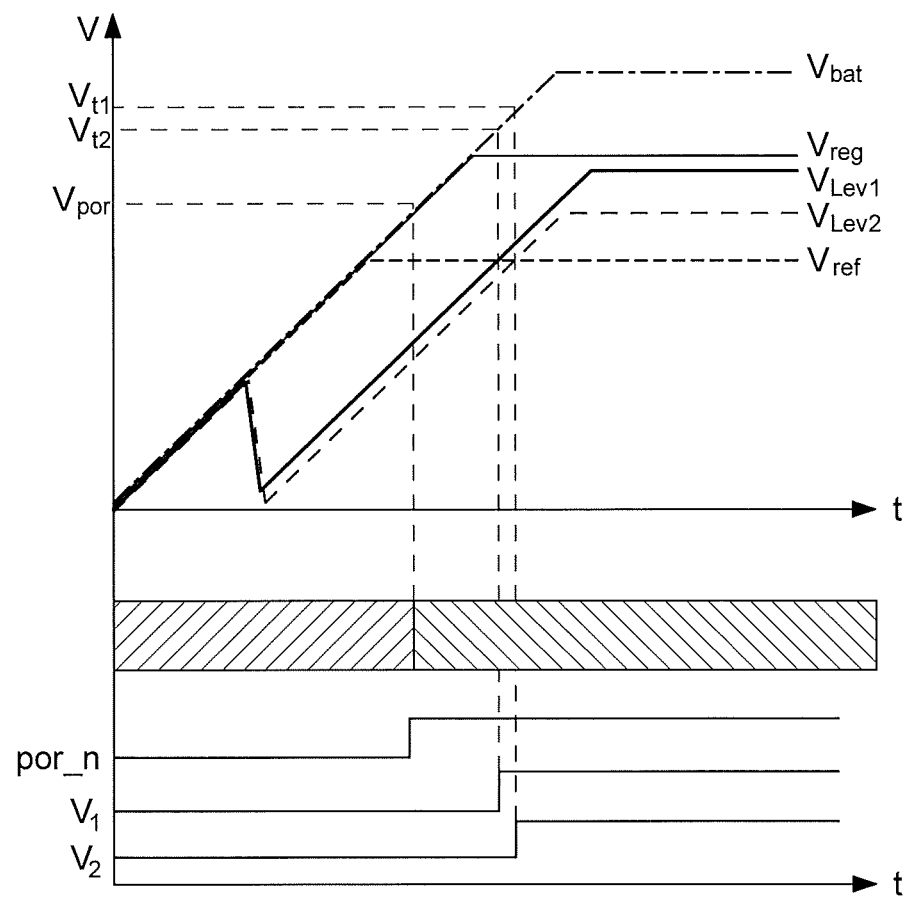
FIG. 3 is a signal diagram illustrating some signal waveforms measured in the power management circuit of FIG. 2.

As can be seen in FIG. 3, the voltage values $V_{bat}$, $V_{reg}$ and $V_{ref}$ increase until they reach their respective maximum value. The value of the first divided supply voltage $V_{Lev1}$ is obtained as follows:

$$V_{Lev1} = \frac{R_2 + R_3}{R_1 + R_2 + R_3} \times V_{bat},$$

where $R_1$, $R_2$ and $R_3$ are the resistance values of the first, second and third resistors R1, R2, R3, respectively.

The value of the second divided supply voltage $V_{Lev2}$ is obtained as follows:

$$V_{Lev2} = \frac{R_3}{R_1 + R_2 + R_3} \times V_{bat}.$$

As can be seen in FIG. 3, at the beginning, the voltage values $V_{Lev1}$ and $V_{Lev2}$ increase until the reference signal generator 3A has finished its start-up phase. Now when closing the switch 17, the voltage values $V_{Lev1}$ and $V_{Lev2}$ drop sharply. Once the switch 17 has been fully closed, the voltage values $V_{Lev1}$ and $V_{Lev2}$ start rising again until they reach their maximum value. When the first divided supply voltage $V_{Lev1}$ crosses the reference voltage $V_{ref}$, the value of the first output voltage signal $V_1$ rapidly increases from '0' to '1' in a stepwise manner, i.e. the first output signal becomes active. This defines a first voltage detection threshold $V_{t2}$ for the supply voltage $V_{bas}$. It is to be noted that during the steady state operation of the power management circuit, the reference voltage value $V_{ref}$ is substantially constant. The moment the first output signal becomes active, the value of $V_{Lev1}$ equals $V_{ref}$. By knowing the values of $V_{Lev1}$ and all the resistance values of the resistors in the resistor circuit 25, the value of $V_{bat}$ may now be determined. Similarly, when the second divided supply voltage $V_{Lev2}$ crosses the reference voltage $V_{ref}$, the second output signal becomes active. This defines a second voltage detection threshold $V_{t1}$ for the supply voltage $V_{bas}$. In this example, the first and second voltage detection thresholds are different. In this manner the supervisory circuit 7A may be used to monitor or track the level of the supply voltage $V_{bat}$.

It is to be noted that the number of different detection levels or thresholds depends on the number of resistors in the resistor circuit 25, also referred to as a resistor ladder (i.e. an electrical circuit made from repeating units of resistors, which may or may not have substantially identical resistance values). More specifically, if the number of the resistors is N, then the number of different detection thresholds is N-1 assuming that every node between two consecutive resistors in the resistor ladder 25 is used as a node to measure a respective divided supply voltage value. Furthermore, for each divided supply voltage value, there is a pair of circuit elements consisting of a comparator and an AND gate. It is to be also noted that the different detection levels are only available as long as the switch 17 remains closed. The start-up unit 21 re-opens the switch 17 when the supply voltage level drops below a given threshold or this switch is automatically set to its open state by the stop of its nominal supply. The start-up unit 21 may receive this information from the reference signal generator 3A.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For example, instead of using various voltage levels in the power management circuit 1, it would be possible to use current values instead. Thus, the voltage comparators would in this case be replaced by current comparators.

The invention claimed is:
1. A power management circuit, comprising:
a reference signal generator configured to provide a reference signal;
a start-up unit,
the start-up unit having a first sensing input for detecting whether a supply voltage provided to the power management circuit is above a threshold voltage,
the start-up unit being configured to:
generate, during a start-up phase, a start-up current for starting-up the reference signal generator when the supply voltage is detected to be above the threshold voltage, and stop generating the start-up current when the power management circuit enters a steady state operational phase, and during the steady state operational phase, the start-up unit having a second sensing input connected to the reference signal generator and receiving from the reference signal generator a state signal indicating whether the power management circuit is in the steady state operational phase; and a supervisory circuit comprising:

an electrical resistance circuit comprising a set of electrical resistance elements connected between a first end node and a second end node of the electrical resistance circuit;

a high power supply input arranged for receiving the supply voltage and connected to the first end node of the electrical resistance circuit;

a reference potential node defining a low power supply input; and a comparator for comparing the reference signal at a first input and an intermediate electrical value at a second input, the second input being connected to an internal electrical node of the electrical resistance circuit, the internal electrical node being located between two consecutive electrical resistance elements of the electrical resistance circuit, the comparator being configured to output a monitoring signal at a comparator output for monitoring a supply of a given electrical level related to the intermediate electrical value; wherein the supervisory circuit further comprises a switch arranged between the second end node of the electrical resistance circuit and the reference potential node, the switch being open when not powered, the start-up unit is configured to control the switch in order to maintain the switch in an open state in the start-up phase and to close the switch when the power management circuit terminates the start-up phase and enters the steady state operational phase, as well as to maintain the switch in an closed state during the steady state operational phase, and the comparator output is connected to a first input of a logic AND gate, while a second input of the logic AND gate is connected to a reset signal generator for receiving a reset signal, an output of the AND gate being connected to an output of the supervisory circuit.

2. The power management circuit according to claim 1, wherein the switch is an n-type metal-oxide-semiconductor field effect transistor.

3. The power management circuit according to claim 1, wherein the reference signal generator comprises a reference current generator and a reference voltage generator, the first sensing input is a voltage sensing input and the second sensing input is a current sensing input, and the reference signal is a reference voltage signal and the state signal is a current signal indicating whether the reference signal generator is in an operational state.

4. The power management circuit according to claim 1, wherein the electrical resistance circuit comprises a given number of internal electrical nodes, each of the internal electrical nodes being located between two consecutive electrical resistance elements, and each of the internal electrical nodes is connected to a respective comparator for providing to the respective comparator a respective intermediate electrical value.

5. The power management circuit according to claim 4, wherein a low reference potential node is at zero electric potential.

6. The power management circuit according to claim 1, wherein the supervisory circuit further comprises a protection circuit between the electrical resistance circuit and the comparator for disconnecting the comparator from the electrical resistance circuit when the intermediate electrical value is above a threshold level.

\* \* \* \* \*